(12) United States Patent
Awada et al.

(10) Patent No.: US 11,310,728 B2
(45) Date of Patent: Apr. 19, 2022

(54) MANAGEMENT OF SYSTEM INFORMATION AREA

(71) Applicant: Nokia Technologies Oy, Espoo (FI)

(72) Inventors: Ahmad Awada, Munich (DE); Ingo Viering, Munich (DE)

(73) Assignee: Nokia Technologies Oy, Espoo (FI)

( * ) Notice: Subject to any disclaimer, the term of this patent is extended or adjusted under 35 U.S.C. 154(b) by 119 days.

(21) Appl. No.: 16/978,544

(22) PCT Filed: Apr. 4, 2018

(86) PCT No.: PCT/IB2018/052338
§ 371 (c)(1),
(2) Date: Sep. 4, 2020

(87) PCT Pub. No.: WO2019/193395
PCT Pub. Date: Oct. 10, 2019

(65) Prior Publication Data
US 2021/0029623 A1 Jan. 28, 2021

(51) Int. Cl.
*H04W 24/10* (2009.01)
*H04W 48/16* (2009.01)
(Continued)

(52) U.S. Cl.
CPC ........... *H04W 48/16* (2013.01); *H04W 24/10* (2013.01); *H04W 28/16* (2013.01); *H04W 72/0446* (2013.01)

(58) Field of Classification Search
CPC ...... H04W 48/16; H04W 48/18; H04W 48/20
See application file for complete search history.

(56) References Cited

U.S. PATENT DOCUMENTS

| 8,364,144 B2 | 1/2013 | Geary et al. |
| 2005/0153700 A1 | 7/2005 | Farnsworth et al. |

(Continued)

FOREIGN PATENT DOCUMENTS

WO  2018/016922 A1  1/2018

OTHER PUBLICATIONS

"3rd Generation Partnership Project; Technical Specification Group Radio Access Network; NR; NR and NG-RAN Overall Description; Stage 2 (Release 15)", 3GPP TS 38.300, V15.0.0, Dec. 2017, pp. 1-68.

(Continued)

*Primary Examiner* — Qutbuddin Ghulamali
(74) *Attorney, Agent, or Firm* — Nokia Technologies Oy

(57) ABSTRACT

Method, apparatus and computer program product able to determining whether a user equipment in a wireless communications network has applied a stored or acquired system information message of a new system information area within a predefined time, where the user equipment replaced a system information message of an initial system information area with a system information message of another system information area or with a cell-specific system information message of another cell. If the new system information area is equivalent to the system information area of the initial system information area, then the system information message for the initial system information area is applied. If the new system information area is different from the system information area of the initial system information area, then a system information message for that different system information area is applied.

20 Claims, 3 Drawing Sheets

(51) Int. Cl.
*H04W 28/16* (2009.01)
*H04W 72/04* (2009.01)

(56) References Cited

U.S. PATENT DOCUMENTS

| | | | |
|---|---|---|---|
| 2010/0022250 A1* | 1/2010 | Petrovic | H04J 11/0093 |
| | | | 455/450 |
| 2012/0100846 A1 | 4/2012 | Saini et al. | |
| 2014/0293901 A1 | 10/2014 | Hegde | |
| 2016/0192269 A1* | 6/2016 | Kim | H04W 36/0072 |
| | | | 370/332 |
| 2018/0103369 A1* | 4/2018 | Chou | H04W 72/0446 |
| 2019/0223145 A1* | 7/2019 | Jung | H04W 76/27 |
| 2020/0359310 A1* | 11/2020 | Ingale | H04W 56/001 |
| 2020/0374782 A1* | 11/2020 | Chen | H04W 76/15 |

OTHER PUBLICATIONS

"Agenda", 3GPP TSG-RAN WG2 Meeting #101, R2-1801700, RAN2 Chairman (Intel), Feb. 26-Mar. 2, 2018, pp. 1-19.

"3rd Generation Partnership Project; Technical Specification Group Radio Access Network NR Radio Resource Control (RRC) protocol specification (Release 15)", 3GPP TS 38.331, V15.0.0, Dec. 2017, pp. 1-188.

"Issues to Be Discussed in Area and Indexed/stored NR SI Acquisition", 3GPP TSG-RAN WG2 Meeting #97, R2-1701501, Agenda: 10.2.2.4, Sony, Feb. 13-17, 2017, 3 pages.

"Area ID and value tag for SIBs", 3GPP TSG-RAN WG2 Meeting AH 1801, R2-1801184, Agenda: 10.4.1.6.2, Huawei, Jan. 22-26, 2018, 3 pages.

International Search Report and Written Opinion received for corresponding Patent Cooperation Treaty Application No. PCT/IB2018/052338, dated Aug. 3, 2018, 17 pages.

"Report of email discussion on [NR-AH1801#12][NR] System information procedures", 3GPP TSG-RAN WG2#101 meeting, R2-1803422, Agenda: 10.4.1.6.2, Samsung, Feb. 26-Mar. 2, 2018, pp. 1-27.

"Signalling of System Information Area", 33GPP TSG-RAN WG2 NR Ad hoc 1801, R2-1801228, Agenda: 10.4.1.6.2, Nokia, Jan. 22-26, 2018, 3 pages.

* cited by examiner

MANAGEMENT OF SYSTEM INFORMATION AREA

RELATED APPLICATION

This application claims priority to PCT Application No. PCT/IB2018/052338, filed on Apr. 4, 2018 which is incorporated herein by reference in its entirety.

TECHNICAL FIELD

This invention relates generally to system information in a wireless communications network and, in particular, to determining whether a user equipment, that has replaced a system information message of one area with that of another area or with cell-specific SI message of another cell, has applied shortly after (within a pre-defined time) the stored or acquired system information message of a third area, where that third area is either the first area or a different area.

BACKGROUND

This section is intended to provide a background or context to the invention disclosed below. The description herein may include concepts that could be pursued, but are not necessarily ones that have been previously conceived, implemented, or described. Therefore, unless otherwise explicitly indicated herein, what is described in this section is not prior art to the description in this application and is not admitted to be prior art by inclusion in this section.

In NR, the System Information (SI) is split into (1) Minimum SI that contains the essential information for PLMN selection, cell selection, L1/L2 parameters for initial access (i.e., content of MIB, SIB 1 and SIB 2 in LTE) and (2) Other SI that contains the remaining SI with information that is not part of the Minimum SI [see, 3GPP TS 38.300; 3GPP; Technical Specification Group Radio Access Network; NR; NR and NG-RAN Overall Description; Stage 2 (Release 15), 2017 Mar. 22].

The Minimum SI is transmitted over two different downlink channels using different RRC messages in NR (MasterInformationBlock and SystemInformationBlockType1). The term Remaining Minimum SI (RMSI) is also used to refer to SystemInformationBlockType1. Other SI is transmitted in SystemInformationBlockType2 and above.

The MIB and RMSI are broadcasted periodically like in LTE system, whereas the Other SI can be periodically broadcasted or delivered on demand. The RMSI includes an indicator whether the concerning SI/SIB message is provided by broadcast or on demand, i.e., one or multiple SIBS are mapped to an SI message. For NR systems operating at high carrier frequency or employing TX beamforming in general, the broadcast transmission is performed using a grid of beams sweeping a set of beams in horizontal and vertical directions to cover all the area of a cell.

The parameters required for requesting an on-demand Other SI message using Msg 1 or Msg 3 [see, 3GPP TSG-RAN WG2 Meeting #101, RAN 2 Chairman, Athens, Greece, 2018 Feb. 26] are included in the RMSI. The network acknowledges the SI request of the UE un Msg 2 or Msg 4 depending on whether SI request is performed using Msg 1 or Msg 3, respectively.

Moreover, to inform the UE on how to receive the Other SI, the RMSI includes the scheduling information: Mapping of the SIBs to SI message, the configuration of the length of the SI window pertaining to each SI message, i.e., the time duration over which the SI message is delivered by the network and scheduled periodically; periodicity of the SI window; etc. The UE can improve the detection probability by combining the multiple repetitions within the SI window, i.e., providing combining/diversity gain.

To limit the number of SI requests, the UE checks in the RMSI whether the SI message of interest will be provided by broadcast before sending the SI request. If the required SI message is not broadcasted, the UE first sends an SI request, otherwise it directly monitors the scheduling information of the SI message for reception.

Each other SI message can be configured by the cell to be either cell-specific or area-specific. In the former case, the value tag associated with the SI message is valid only within the cell. In other words, a UE can re-use a stored SI message upon returning to the cell if it has the same value tag as that indicated in RMSI. The UE discards a stored SI message after a validity time, for instance a time period such as 3 hours, has expired.

If the other SI message is common to many cells, the network can configure the SI message to be area specific. In other words, a UE can re-use a stored SI message in a new cell if it belongs to same System Information Area (SIA) and the value tag indicated in RMSI is the same as that of the stored one.

In RAN 2 meeting #101, the following agreements were made with respect to the definition of SIA: (1) SI Area ID (SIAID) is locally unique within TA (where how the bits are allocated to SIAID in SIB1 is still under consideration); and (2) TAC+SIAID combination to be taken into account while defining rules for validity of stored area-specific SIBs, where previous writings may be useful as background to the current invention The SI Area ID (SIAID) is locally unique within Tracking Area (TA) and is broadcasted in RMSI. Hence, the UE has to re-acquire a stored SI message if it leaves the associated TA. Moreover, it has been agreed that the SI storage and management of stored SI, i.e., how many SI messages to store, are left for implementation via UE.

The current invention moves beyond these techniques.

Acronyms or abbreviations that may be found in the specification and/or the drawing figures are defined within the context of this disclosure or as follows below:
3GPP Third Generation Partnership Project
5G 5th Generation
BS Base Station
DL Downlink
eNB or eNodeB evolved Node B
gNB NR/5G Node B
ID Identity
IP Internet Protocol
IMT International Mobile Telecommunications (4, 4.5G or 5G)
L1 Layer 1
L2 Layer 2
LTE Long Term Evolution
LTE-A Long Term Evolution—Advanced
MBMS Multimedia Broadcast Multicast Service
MDT Minimization of Drive Tests
MIB Master Information Block
MRO Mobility Robustness Optimization
MME Mobility Management Entity
Msg. 1 UE sends RACH Request to BS
Msg. 2 BS sends RACH Response to UE with Temp_C_RNTI
Msg. 3 UE sends UE Identification Message to BS
Msg. 4 BS sends Contention Resolution Message to UE
NCE Network Control Entity NR New Radio or New Radio Access
PLMN Public Land Mobile Network
RACH Random Access CHannel
Rel Release
RMSI Remaining Minimum System Information
RRC Radio Resource Control
Rx Receive, Reception, or Receiver
SC-PtM Single-Cell Point-to-Multipoint
SI System Information
SIA System Information Area
SIAID SI Area Identification/Identity
SIB System Information Block
TA Tracking Area
TCE Trace Collection Entity
TS Technical Specification
TRP Transmission reception point
Tx Transmit, Transmission, or Transmitter
UE User Equipment
UL Uplink

BRIEF SUMMARY

This section is intended to include examples and is not intended to be limiting. The word "exemplary" as used herein means "serving as an example, instance, or illustration." Any embodiment described herein as "exemplary" is not necessarily to be construed as preferred or advantageous over other embodiments. All of the embodiments described in this Summary are exemplary embodiments, provided to enable persons skilled in the art to make or use the invention and not to limit the scope of the invention which is defined by the claims.

An example of an embodiment of the current invention is a method that comprises determining whether a UE, where the UE is in cell of a wireless communications network and where the UE replaced a system information message of a first system information area with a system information message of a second system information area or with a cell-specific system information message of another cell, applied a stored or acquired system information message of a third system information area within a predefined time, where, in response to the third system information area being an equivalent system information area to the first system information area, the system information message for the first system information area is applied; and where, in response to the third system information area being a different system information area from the first system information area, a system information message for the different system information area is applied.

Another example of an embodiment of the current invention is an apparatus that comprises at least one processor and at least one memory including computer program code, where the at least one memory and the computer code are configured, with the at least one processor, to cause the apparatus to at least perform the following: determining whether a UE, where the UE is in cell of a wireless communications network and where the UE replaced a system information message of a first system information area with a system information message of a second system information area or with a cell-specific system information message of another cell, applied a stored or acquired system information message of a third system information area within a predefined time, where, in response to the third system information area being an equivalent system information area to the first system information area, the system information message for the first system information area is applied; and where, in response to the third system information area being a different system information area from the first system information area, a system information message for the different system information area is applied.

A further example of an embodiment of the current invention is a computer program product embodied on a non-transitory computer-readable medium in which a computer program is stored that, when being executed by a computer, is configured to provide instructions to control or carry out: determining whether a UE, where the UE is in cell of a wireless communications network and where the UE replaced a system information message of a first system information area with a system information message of a second system information area or with a cell-specific system information message of another cell, applied a stored or acquired system information message of a third system information area within a predefined time, where, in response to the third system information area being an equivalent system information area to the first system information area, the system information message for the first system information area is applied; and where, in response to the third system information area being a different system information area from the first system information area, a system information message for the different system information area is applied.

A yet additional example of an embodiment of the current invention is an apparatus with means for determining whether a UE, where the UE is in cell of a wireless communications network and where the UE replaced a system information message of a first system information area with a system information message of a second system information area or with a cell-specific system information message of another cell, applied a stored or acquired system information message of a third system information area within a predefined time, where, in response to the third system information area being an equivalent system information area to the first system information area, the system information message for the first system information area is applied; and where, in response to the third system information area being a different system information area from the first system information area, a system information message for the different system information area is applied.

DETAILED DESCRIPTION OF THE DRAWINGS

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Using current 3GPP specifications, the network cannot detect if the RRC idle/inactive UEs have used for a short time an SI message of a different SIA 2 or failed to acquire the SI message from SIA 2, i.e., if the SI message is not provided by SIA 2.

One solution would be to use logged Minimization of Drive Tests (MDT) information. Herein, a selected number of UEs in connected mode are configured to collect, in idle mode, measurement results for serving and neighboring cells, and to report the logged information during the next transition to the connected mode. Although the MDT information may provide some information about coverage of each SIA, it has the following drawbacks:

The network may have to configure a high number of UEs to perform and log MDT measurements, among which only few are actually used to find the coverage islands, which causes unnecessary logging of the information for most of the UEs;

MDT requires performing measurements for serving and neighboring cells which is not the best solution for the investigated problem, since measurements are not needed as described in the next section;

Logged MDT produces a lot of information, since measurements are regularly stored, which is much more information than needed specifically for the problem at hand; and Logged MDT is a rather complex feature, and it is still not supported by all UEs, and also operators are reluctant to use this feature.

As such, the MDT solution is not tailored for solving the investigated problem. More slim, yet accurate, solutions can be designed such that only the required UEs are involved in detecting the investigated problem in the network.

The invention proposes new means that allow the network to determine whether a UE, that has replaced an SI message of SIA X with that of SIA Y or with a cell-specific SI message of another cell, has applied shortly thereafter (within a pre-defined time) the stored/or acquired SI message of SIA Z.

Figure 1:
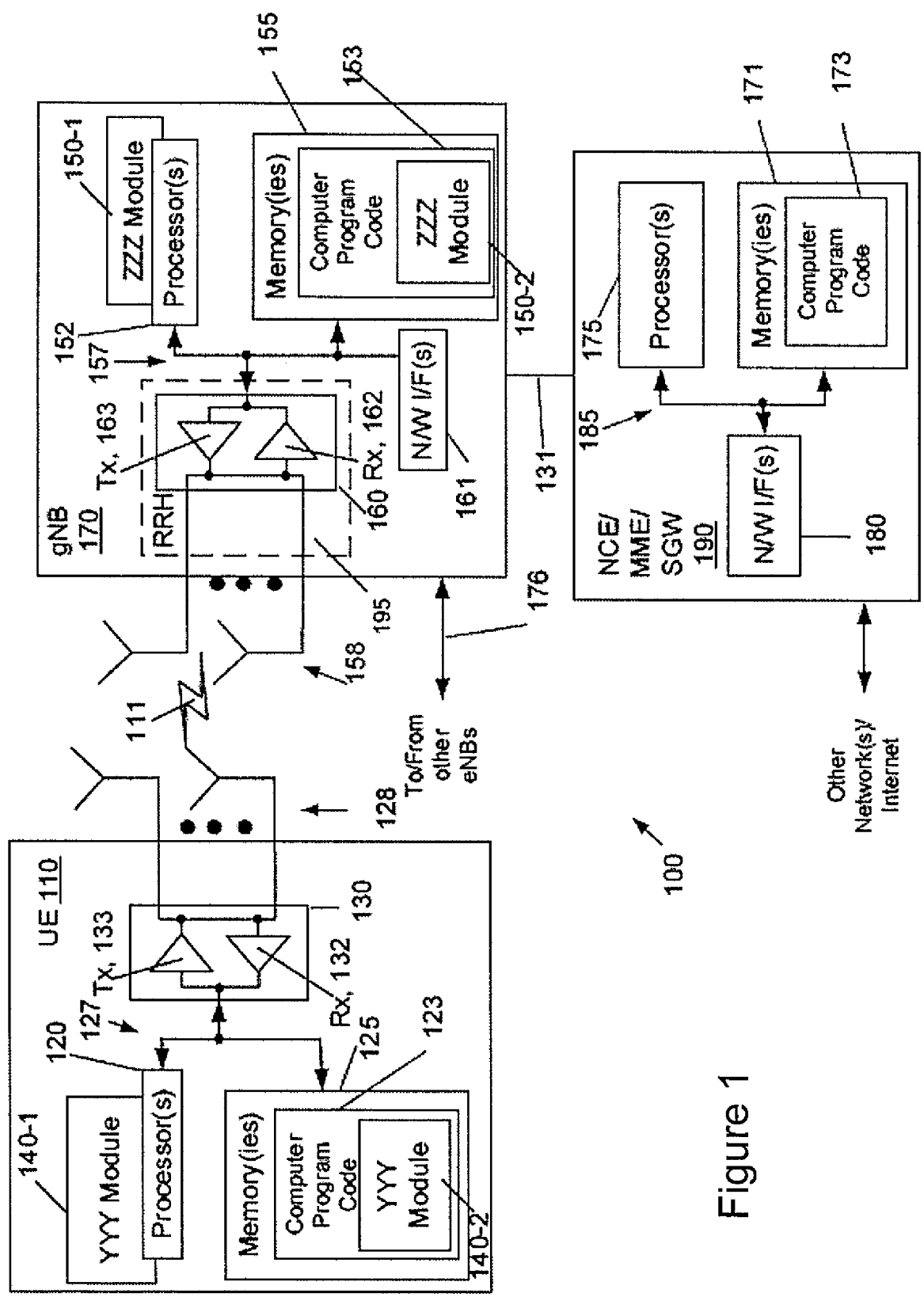
FIG. 1 is a block diagram of an exemplary system in which the exemplary embodiments may be practiced.

Before turning to how an exemplary embodiment would function, FIG. 1 is presented showing a block diagram of one possible and non-limiting exemplary system in which the exemplary embodiments may be practiced. Note that the YYY and ZZZ modules described below bare no relation to and should not be confused with the X, Y, and Z areas.

In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123.

The UE 110 includes a YYY module 140, comprising one of or both parts 140-1 and/or 140-2, which may be implemented in a number of ways. The YYY module 140 may be implemented in hardware as YYY module 140-1, such as being implemented as part of the one or more processors 120. The YYY module 140-1 may be implemented also as an integrated circuit or through other hardware such as a programmable gate array. In another example, the YYY module 140 may be implemented as YYY module 140-2, which is implemented as computer program code 123 and is executed by the one or more processors 120. For instance, the one or more memories 125 and the computer program code 123 may be configured to, with the one or more processors 120, cause the user equipment 110 to perform one or more of the The base station 170 (which in the shown embodiment is a gNB or NR/5G Node B but possibly an evolved NodeB for LTE, long term evolution, but could be any similar access point to a wireless network) that provides access by wireless devices such as the UE 110 to the wireless network 100. The gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153.

The gNB 170 includes a ZZZ module 150, comprising one of or both parts 150-1 and/or 150-2, which may be implemented in a number of ways. The ZZZ module 150 may be implemented in hardware as ZZZ module 150-1, such as being implemented as part of the one or more processors 152. The ZZZ module 150-1 may be implemented also as an integrated circuit or through other hardware such as a programmable gate array. In another example, the ZZZ module 150 may be implemented as ZZZ module 150-2, which is implemented as computer program code 153 and is executed by the one or more processors 152. For instance, the one or more memories 155 and the computer program code 153 are configured to, with the one or more processors 152, cause the gNB 170 to perform one or more of the operations as described herein. The one or more network interfaces 161 communicate over a network such as via the links 176 and 131. Two or more gNBs 170 communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the gNB 170 being physically in a different location from the RRH, and the one or more buses 157 could be implemented in part as fiber optic cable to connect the other elements of the gNB 170 to the RRH 195.

It is noted that description herein indicates that "cells" perform functions, but it should be clear that the gNB that forms the cell would perform the functions. The cell makes up part of a gNB. That is, there can be multiple cells per gNB. For instance, there could be three cells for a single gNB carrier frequency and associated bandwidth, each cell covering one-third of a 360-degree area so that the single gNB's coverage area covers an approximate oval or circle. Furthermore, each cell can correspond to a single carrier and a gNB may use multiple carriers. So if there are three 120-degree cells per carrier and two carriers, then the eNB has a total of 6 cells.

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). The gNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155 and 171 may be of any type suitable to the local technical environment and may be implemented using any suitable data storage technology, such as semiconductor based memory devices, flash memory, magnetic memory devices and systems, optical memory devices and systems, fixed memory and removable memory. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments of the user equipment 110 can include, but are not limited to, cellular telephones such as smart phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Embodiments herein may be implemented in software (executed by one or more processors), hardware (e.g., an application specific integrated circuit), or a combination of software and hardware. For example, in an embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, as in FIG. 1 for example. A computer-readable medium may comprise a computer-readable storage medium (e.g., memories 125, 155, 171 or other device) that may be any media or means that can contain or store the instructions for use by or in connection with an instruction execution system, apparatus, or device, such as a computer.

The current architecture in LTE networks is fully distributed in the radio and fully centralized in the core network. The low latency requires bringing the content close to the radio which leads to local break out and multi-access edge computing (MEC). 5G may use edge cloud and local cloud architecture. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services and augmented reality. In radio communications, using edge cloud may mean node operations to be carried out, at least partly, in a server, host or node operationally coupled to a remote radio head or base station comprising radio parts. It is also possible that node operations will be distributed among a plurality of servers, nodes or hosts. It should also be understood that the distribution of labor between core network operations and base station operations may differ from that of the LTE or even be non-existent. Some other technology advancements probably to be used are Software-Defined Networking (SDN), Big Data, and all-IP, which may change the way networks are being constructed and managed.

One possible manner to carry out embodiments described herein is with an edge cloud using a distributed computing system. An exemplary embodiment comprises a radio node connected to a server. Exemplary embodiments implementing the system allow the edge cloud server and the radio node as stand-alone apparatuses communicating with each other via a radio path or via a wired connection or they may be located in a same entity communicating via a wired connection.

Returning the discussion above, prior to the description of an exemplary embodiment, the SIA would be defined by the set of cells having the same SI message covering a certain geographic area. As a result, the network operator would expect that all UEs that are confined within this geographic area to use the corresponding common SI message.

However, due to shadowing, the borders between the coverage of cells, and in turn different SIAs, are smeared causing some geographic areas in SIA 1 to be covered by another SIA, e.g., SIA 2.

Figure 2:
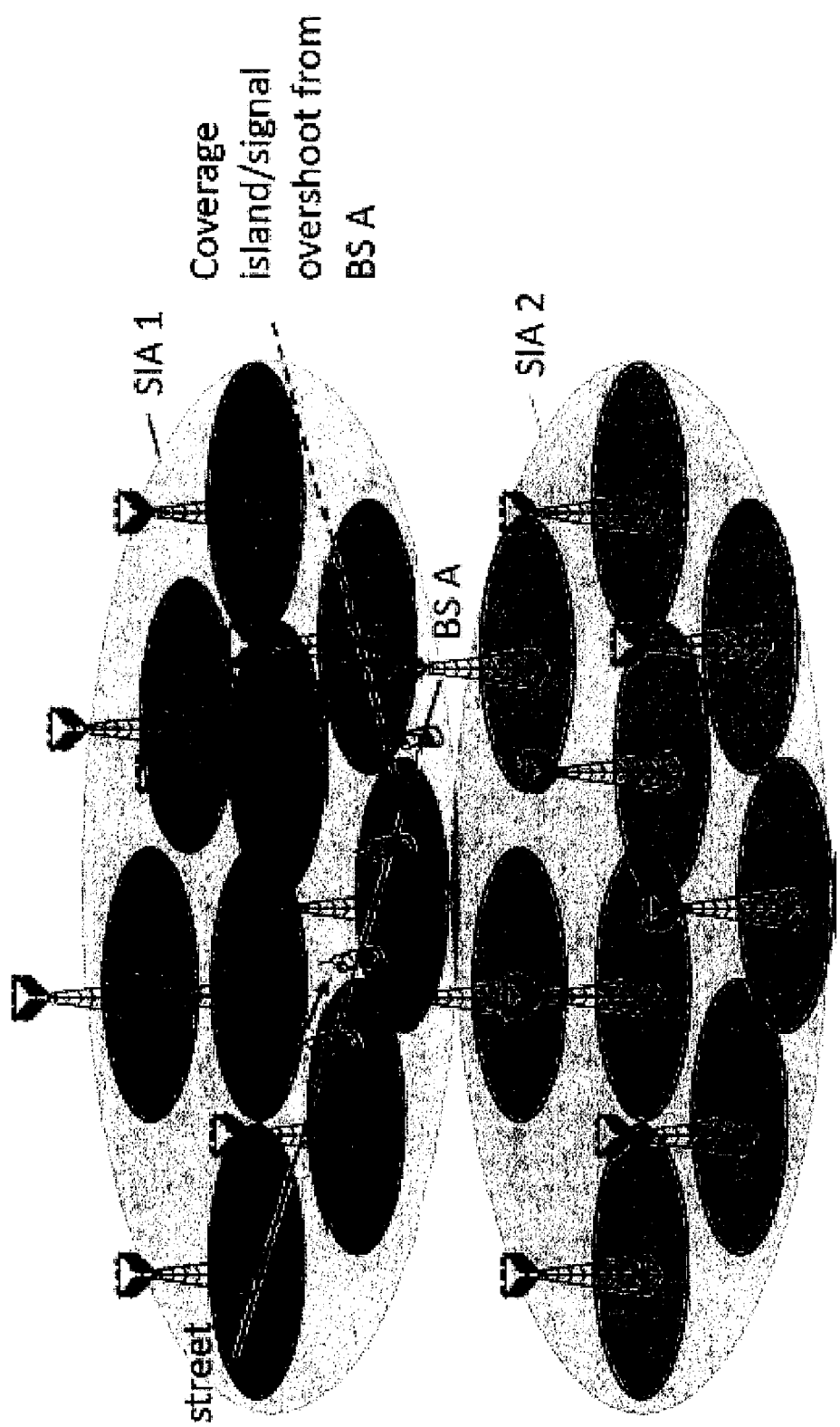
FIG. 2 is a depiction of an exemplary environment in which the embodiments of the present invention could be practiced where BS A from SIA 2 covers some areas in SIA 1.

For illustration, FIG. 2 shows one example where base station (BS) A from SIA 2 covers some areas in SIA 1 due to signal overshoot, i.e., coverage island.

When crossing the coverage island, the UEs having a stored version of SI message for SIA 1 have to acquire the SI message for SIA 2 if they don't have a valid stored SI, where the consequences are as follows:

If the SI message is delivered on-demand, the UEs may have to send new SI requests to BS A which has to broadcast in turn the requested SI message. This can happen as well when the UEs come back to SIA 1 after leaving the coverage island of BS A. These consecutive toggling between SI messages of different SIAs lead to an increase in uplink and downlink overhead in the network.

It could happen that the SI message stored for SIA 1 is not available in SIA 2. For instance, the SI message could be related to a service such as Multimedia Broadcast Multicast Service (MBMS) or Single-Cell Point-to-Multipoint (SC-PtM) transmission that are supported in non-connected mode. In another example, the SI message could be related to information related to traffic steering between cellular network and WLAN or inter-frequency cell re-selection (e.g., re-select to 5G small cells operating at high carrier frequency). In both cases, the UE cannot acquire the SI message which might lead to some interruption or mal-functioning in the service (e.g. UE cannot receive MBMS or SC-PtM over broadcast), or to reduced operation (e.g. the UE cannot interact with WLAN).

UEs may have to apply a different SI configuration of SIA 2 even if they are geographically located in SIA 1. This may impair the UE operation if the UEs located in the geographic area of SIA 1 are meant to use only SI message of SIA 1. For instance, UEs on the indicated street shall use a specific service requiring the SI configuration of SIA 1. However, since coverage islands like the illustrated one cannot be predicted in many cases during the planning phase, the street UEs will acquire the (wrong) SI from SIA 2. In this case, it would be desirable to add the cell which is responsible for the island to SIA 1.

A problem that the invention aims to solve is how to detect the existence of areas in SIA 1 that are covered by another SIA 2, for which the UEs re-select for a short time. Once these areas are detected, the network operator can react, for instance, by down-tilting the antenna tilt of BS A, or re-configuring BS A to belong to SIA 1.

Please note that it is assumed that the UE is in RRC idle mode or RRC inactive. For connected mode, there are already solutions in place (UE history, Mobility Robustness Optimization (MRO), etc.). It is also important to understand that the SI request from the idle mode or RRC inactive is a very slim RACH information containing no information about the UE, its location, or any other context information which would allow to identify the UE or any of its properties. The network just receives a fully anonymous SI request.

As mentioned above, this invention proposes new means that allow the network to determine whether a UE, that has replaced an SI message of SIA X with that of SIA Y or with a cell-specific SI message of another cell, has applied shortly after (within a pre-defined time) the stored or acquired SI message of SIA Z. In other words, if the UE does not have a valid stored SI message for SIA Z, it has to acquire it first and then apply it. On the other hand, if the UE has a stored SI message for SIA Z, the UE would re-apply directly the stored SI message.

This covers the following two cases:

In the first case, SIA Z is the same as SIA X, so a UE replaces SI message of SIA 1 with that of SIA 2 and, shortly thereafter, the UE applies the stored or acquired SI message for SIA 1.

In the second case, SIA Z is different from SIA X, so in this case, the UE replaces SI message of SIA 1 with that of SIA 2 and, shortly thereafter, the UE applies the stored or acquired SI message for SIA 3 that is different from SIA 1.

Moreover, the current invention additionally proposes new means that allow the network to determine whether a UE, that has performed cell-reselection from a cell of SIA X to another cell of SIA Y or to another cell C with cell-specific SI message, has failed for a pre-defined short time to acquire and apply an SI message for SIA Y or cell C before re-selecting to a cell of SIA Z. In other words, this is done if the UE fails to acquire and apply an SI message for SIA Y or cell C. As before, Z can be the same or different than X. This covers the case when the SI message is not provided by BS A of SIA 2 as shown in FIG. 2.

Figure 3:
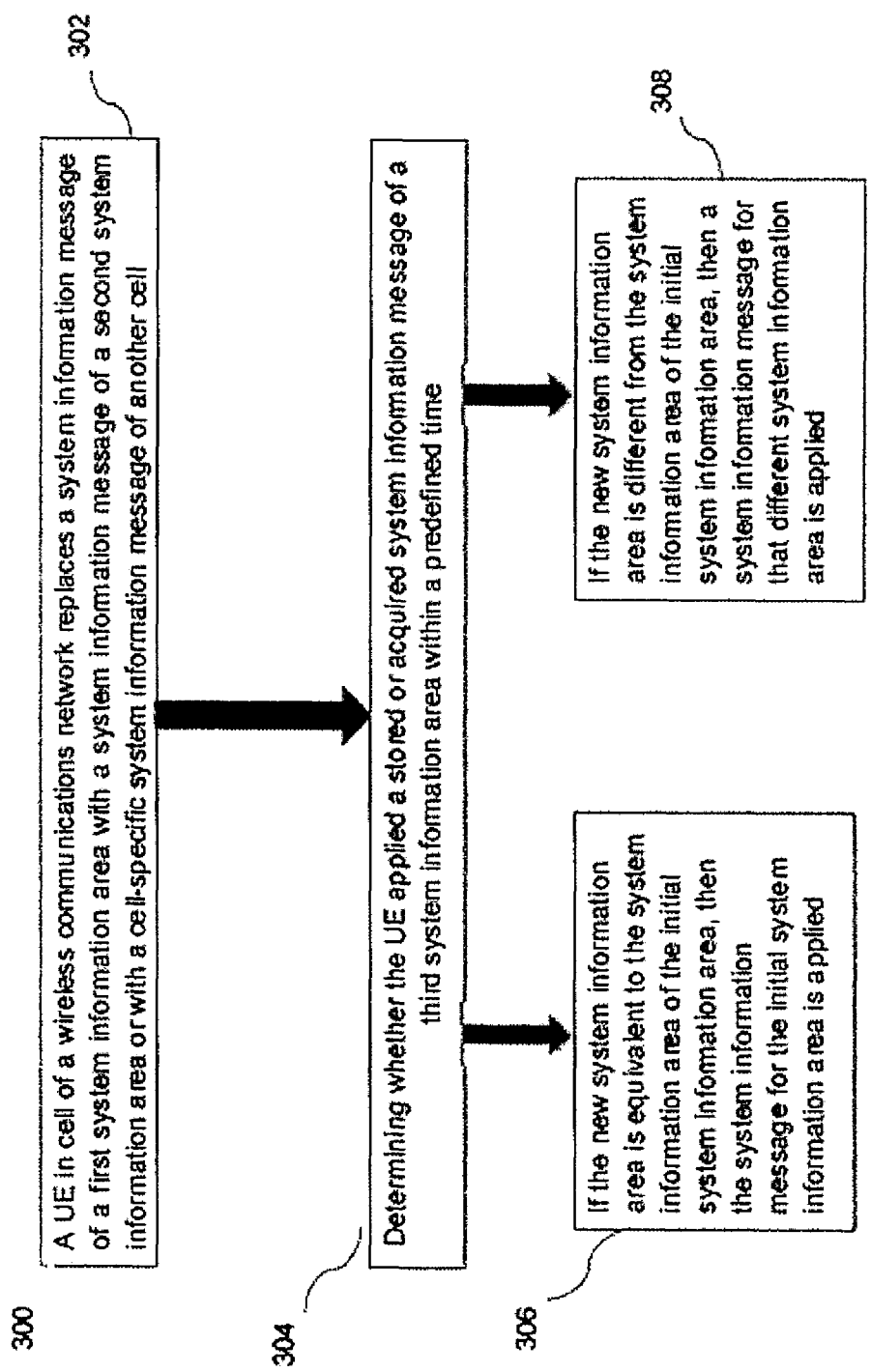
FIG. 3 is a logic flow diagram of an exemplary method of the implementation of the current invention, a result of execution of computer program instructions embodied on a computer readable memory, functions performed by logic implemented in hardware, and/or interconnected means for performing functions in accordance with exemplary embodiments.

FIG. 3 is a logic flow diagram of an exemplary method of an implementation of the current invention, a result of execution of computer program instructions embodied on a computer readable memory, functions performed by logic implemented in hardware, and/or interconnected means for performing functions in accordance with exemplary embodiment.

In FIG. 3, item 300 presents the exemplary method. In step 302, a UE in cell of a wireless communications network replaces a system information message of a first system information area with a system information message of a second system information area or with a cell-specific system information message of another cell. Step 304 represents determining whether the UE applied a stored or acquired system information message of a third system information area within a predefined time. From step 304, the exemplary method can take one of two paths. It takes path 306 if the new system information area is equivalent to the system information area of the initial system information area, then the system information message for the initial system information area is applied. It takes path 308 if the new system information area is different from the system information area of the initial system information area, then a system information message for that different system information area is applied.

The invention can distinguish between a network implementation and a UE implementation. In contrast to UE-implementation, the network implementation has some limitations as explained below.

Network-Implementation

In a first aspect of the invention, having received an SI request from the UE, the serving BS tags the SI request with a timestamp. In a second aspect of the invention, the BS forwards to the network management entity, e.g., Operation and Maintenance Center (OAM) or Trace Collection Entity (TCE), the timestamps of the SI requests along with the SI message being requested. In a third aspect of the invention, using the received timestamps, the network management entity tries to estimate whether the UE has switched forth and back between two SI messages of different SIAs within a short time.

Each of these solutions are a possibility when (1) the SI message is provided on-demand and (2) the UE stores only the SI message of the SIA that it is camps on, such that the UE would always need to send a SI request when switching SIAs.

Note that the more critical the problem is, the more often those SI requests are reported, i.e., the more unique the problem can be detected. In particular in a street scenario as shown in FIG. 2, the number of SI requests will be abnormally and unexpectedly large which simplifies the detection of the problem.

As noted above, the network implementation has the two limitations. First, if the UE has a valid stored SI message for at least one of the SIAs, it may replace the SI message when switching SIA without sending any SI request. In this case, the network won't be aware of the toggling in the SI messages. Secondly, the accuracy of the information retrieved from the timestamps may not be that high as it depends on the algorithms treating the gathered data.

In network implementation, the apparatus performing the determining is a network management entity which can be a separate entity that is not part of the base station (centralized approach) or part of a base station (distributed approach). In latter approach, the network management entity can be in any base station. The network management entity will make use of the timestamps collected by the base stations for the determining in Step 304 of FIG. 3. As all the base stations of the network could or will have timestamps corresponding to SI requests from the UE, the same base station having time stamps could forward them to a network management entity that it hosts.

UE-Implementation

In one aspect of the invention, upon replacing an SI message for SIA X with another for SIA Y or with cell-specific SI message of another cell C, the UE starts a timer (and potentially stores the SIA ID X and Y and the new and previous cell IDs).

In a second aspect of the invention, if the UE replaces an SI message while the timer is running, the UE will stop the tinier and create "short SIA report" comprising at least one of the following information: SIA ID corresponding to the new SI message; SIA ID corresponding to the previous SI message; SIA ID which may have been stored when the timer was started; Cell ID (physical or global) of the previous and the new cell; and Cell ID (physical or global) which may have been stored when the time was started.

In a third aspect of the UE-implementation of the current invention, when the timer expires, the stored information (if any) is discarded, and no further action is taken.

A fourth aspect of the invention is where the duration of the timer is provided by the network.

In another aspect, namely, the fifth aspect for this implementation, if the UE has failed to acquire and apply the SI message of the new STA Y or cell-specific SI message of new cell C for a pre-defined short time before re-selecting to another SIA Z, then the UE creates a "short SIA report" that contains, in addition to the cell identities and SIAs that it has visited/switched in between (defined above in the second aspect of the UE-implementation), an indication about the SI message that it has failed to receive.

A sixth aspect of the UE-implementation is one where the network may request UEs to send the stored "short SIA report" if available, when they are in connected mode.

And in a seventh aspect, the UE may send the "short SIA report" to the network upon receiving a network request.

In an eighth aspect, the UE may discard the "short SIA report" after some pre-defined time, e.g., 48 hours, if not fetched by the network.

Although various aspects of the invention are set out in the independent claims, other aspects of the invention comprise other combinations of features from the described embodiments and/or the dependent claims with the features of the independent claims, and not solely the combinations explicitly set out in the claims.

Without in any way limiting the scope, interpretation, or application of the claims appearing below, an advantage or technical effect of one or more of the exemplary embodiments disclosed herein is that the network can identify accurately the involved cells and SIAs where UEs may have applied for a short time an unintended area-specific SI message of a different SIA or unintended cell-specific SI message of another cell.

A further advantage or technical effect of one or more of the exemplary embodiments disclosed herein is that the network can identify accurately the involved cells and SIAs where UEs may have failed to apply for a short time the required SI message.

If desired, the different functions discussed herein may be performed in a different order and/or concurrently with each other. Furthermore, if desired, one or more of the above-described functions may be optional or may be combined.

An example of an embodiment of the current invention, which can be referred to as item 1, is a method that comprises determining whether a UE, where the UE is in cell of a wireless communications network and where the UE replaced a system information message of a first system information area with a system information message of a second system information area or with a cell-specific system information message of another cell, applied a stored or acquired system information message of a third system information area within a predefined time, where, in response to the third system information area being an equivalent system information area to the first system information area, the system information message for the first system information area is applied; and where, in response to the third system information area being a different system information area from the first system information area, a system information message for the different system information area is applied.

An example of a further embodiment of the current invention, which can be referred to as item 2, is the method of item 1, where the determining is done by a network management entity that is separate from the base stations.

An example of a further embodiment of the current invention, which can be referred to as item 3, is the method of claim 1, where the method is performed by a network management entity that is comprised within a base station.

An example of a further embodiment of the current invention, which can be referred to as item 4, is the method of any of items 2 or 3, where the predefined time is based on timestamps.

An example of a further embodiment of the current invention, which can be referred to as item 5, is the method of item 4, where the timestamps comprise indications of system information requests by the UE to a serving base station of the UE.

An example of a further embodiment of the current invention, which can be referred to as item 6, is the method of item 5, where the timestamps indicating the system information requests along with system information messages associated with the requests are forwarded to the network management entity for the network management entity to ascertain the predefined time being met.

An example of a further embodiment of the current invention, which can be referred to as item 7, is the method of any of items 2 through 6, where a system information message is provided on-demand using a system information request.

An example of a further embodiment of the current invention, which can be referred to as item 8, is the method of any of items 2 through 7, where the UE stores or acquires only a system information message of a system information area that the UE is camped on such that the UE sends a system information request when switching system information areas or to another cell with cell-specific system information message.

An example of a further embodiment of the current invention, which can be referred to as item 9, is the method of item 1, where the method is performed by the UE.

An example of a further embodiment of the current invention, which can be referred to as item 10, is the method of item 9, where a timer is started when the UE replaces the system information message of the first system information area with the system information message of the second system information area or with the cell-specific system information message of the other cell, and where the expiration of the timer is the predefined time.

An example of a further embodiment of the current invention, which can be referred to as item 11, is the method of item 10, where if the UE replaces a system information message while the timer is running, then the UE will stop the timer and create and/or store a report.

An example of a further embodiment of the current invention, which can be referred to as item 12, is the method of item 10, where if the UE fails to acquire and apply the system information message of the second system information area or the cell-specific system information message of the other cell within the predefined time before applying the third system information, then the UE will create and/or store a report and an indication about the failure.

An example of a further embodiment of the current invention, which can be referred to as item 13, is the method of items 11 or 12, where the report comprises at least one of the following: SIA ID corresponding to the new SI message, SIA ID corresponding to the previous SI message, SIA ID which may have been stored when the timer was started, Cell ID (physical or global) of the previous and the new cell, Cell ID (physical or global) which may have been stored when the time was started.

An example of a further embodiment of the current invention, which can be referred to as item 14, is the method of any of items 11 through 13, where when the timer expires, then any report is discarded.

An example of a further embodiment of the current invention, which can be referred to as item 15, is the method of any of items 11 through 14, where UE sends the created and/or stored report to the network upon receiving a network request.

An example of a further embodiment of the current invention, which can be referred to as item 16, is the method of any of items 11 through 15, where the UE discards the created and/or stored report after not requested by or sent to the network within a preselected period.

An example of a further embodiment of the current invention, which can be referred to as item 17, is the method of any of items 11 through 16, where the duration of the timer is provided by the network.

Another example of an embodiment of the current invention, which can be referred to as item 18, is an apparatus that comprises at least one processor and at least one memory including computer program code, where the at least one memory and the computer code are configured, with the at least one processor, to cause the apparatus to at least perform the following: determining whether a UE, where the UE is in cell of a wireless communications network and where the UE replaced a system information message of a first system information area with a system information message of a second system information area or with a cell-specific system information message of another cell, applied a stored or acquired system information message of a third system information area within a predefined time, where, in response to the third system information area being an equivalent system information area to the first system information area, the system information message for the first system information area is applied; and where, in response to the third system information area being a different system information area from the first system information area, a system information message for the different system information area is applied.

An example of an additional embodiment of the current invention, which can be referred to as item 19, is the apparatus of item 18, wherein the apparatus is a network management entity that is separate from the base station, or wherein the apparatus is a network management that is comprised within a base station, where this base station can be the serving base station or another base station in the network.

An example of an additional embodiment of the current invention, which can be referred to as item 20, is the apparatus of item 19, where the predefined time is based on timestamps.

An example of an additional embodiment of the current invention, which can be referred to as item 21, is the apparatus of item 20, where the timestamps comprise indications of system information requests by the UE to a serving base station of the UE. Here, the serving base station is one receiving the timestamps from the camped UE.

An example of an additional embodiment of the current invention, which can be referred to as item 22, is the apparatus of item 21, where the timestamps indicating the system information requests along with system information messages associated with the requests are forwarded to the network management entity for the network management entity to ascertain the predefined time being met.

An example of an additional embodiment of the current invention, which can be referred to as item 23, is the apparatus of any of items 19 through 22, where a system information message is provided on-demand using a system information request.

An example of an additional embodiment of the current invention, which can be referred to as item 24, is the apparatus of any of items 19 through 23, where the UE stores or acquires only a system information message of a system information area that the UE is camped on such that the UE sends a system information request when switching system information areas or to another cell with cell-specific system information message.

An example of an additional embodiment of the current invention, which can be referred to as item 25, is the apparatus of item 18, wherein the apparatus is the UE.

An example of an additional embodiment of the current invention, which can be referred to as item 26, is the apparatus of item 25, where a timer is started when the UE replaces the system information message of the first system information area with the system information message of the second system information area or with the cell-specific system information message of the other cell, and where the expiration of the timer is the predefined time.

An example of an additional embodiment of the current invention, which can be referred to as item 27, is the apparatus of item 26, where if the UE replaces a system information message while the timer is running, then the UE will stop the timer and create and/or store a report.

An example of an additional embodiment of the current invention, which can be referred to as item 28, is the apparatus of item 26, where if the UE fails to acquire and apply the system information message of the second system information area or the cell-specific system information message of the other cell within the predefined time before applying the third system information, then the UE will create and/or store a report and an indication about the failure.

An example of an additional embodiment of the current invention, which can be referred to as item 29, is the apparatus of items 27 or 28, where the report comprises at least one of the following: SIA ID corresponding to the new SI message, SIA ID corresponding to the previous SI message, SIA ID which may have been stored when the timer was started, Cell ID (physical or global) of the previous and the new cell, Cell ID (physical or global) which may have been stored when the time was started.

An example of an additional embodiment of the current invention, which can be referred to as item 30, is the apparatus of any of items 27 through 29, where when the timer expires, then any report is discarded.

An example of an additional embodiment of the current invention, which can be referred to as item 31, is the apparatus of any of items 27 through 30, where UE sends the created and/or stored report to the network upon receiving a network request.

An example of an additional embodiment of the current invention, which can be referred to as item 32, is the apparatus of any of items 27 through 31, where the UE discards the created and/or stored report after not requested by or sent to the network within a preselected period.

An example of an additional embodiment of the current invention, which can be referred to as item 33, is the apparatus of any of items 27 through 32, where the duration of the timer is provided by the network.

Yet another example of an embodiment of the current invention, which can be referred to as item 34, is a computer program comprising code for determining whether a UE, where the UE is in cell of a wireless communications network and where the UE replaced a system information message of a first system information area with a system information message of a second system information area or with a cell-specific system information message of another cell, applied a stored or acquired system information message of a third system information area within a predefined time, where, in response to the third system information area being an equivalent system information area to the first system information area, the system information message for the first system information area is applied; and where, in response to the third system information area being a different system information area from the first system information area, a system information message for the different system information area is applied.

Yet still another example of an embodiment of the current invention, which can be referred to as item 35, is the computer program code of item 34, where the code is comprising in a computer-readable storage medium for use with a computer.

A further example of an embodiment of the current invention, which can be referred to as item 36, is a computer program product embodied on a non-transitory computer-readable medium in which a computer program is stored that, when being executed by a computer, is configured to provide instructions to control or carry out: determining whether a UE, where the UE is in cell of a wireless communications network and where the UE replaced a system information message of a first system information area with a system information message of a second system information area or with a cell-specific system information message of another cell, applied a stored or acquired system information message of a third system information area within a predefined time, where, in response to the third system information area being an equivalent system information area to the first system information area, the system information message for the first system information area is applied; and where, in response to the third system information area being a different system information area from the first system information area, a system information message for the different system information area is applied.

A yet additional example of an embodiment of the current invention, which can be referred to as item 37, is an apparatus with means for determining whether a UE, where the UE is in cell of a wireless communications network and where the UE replaced a system information message of a first system information area with a system information message of a second system information area or with a cell-specific system information message of another cell, applied a stored or acquired system information message of a third system information area within a predefined time, where, in response to the third system information area being an equivalent system information area to the first system information area, the system information message for the first system information area is applied; and where, in response to the third system information area being a different system information area from the first system information area, a system information message for the different system information area is applied.

Although various aspects are set out above, other aspects comprise other combinations of features from the described embodiments, and not solely the combinations described above. If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes examples of embodiments of the invention, these descriptions should not be viewed in a limiting sense. Rather, there are several variations and modifications which may be made without departing from the scope of the present invention as defined in the appended claims.

What is claimed is:

1. A method comprising:
   determining whether a user equipment, where the user equipment is in a cell of a wireless communications network and where the user equipment replaced a system information message of a first system information area with a system information message of a second system information area or with a cell-specific system information message of another cell, applied a stored or acquired system information message of a third system information area within a predefined time, wherein the predefined time is based on a start and expiration time of a timer by the user equipment,
   wherein, when the third system information area being the same system information area as the first system information area, the system information message for the first system information area is applied; and
   wherein, when the third system information area being a different system information area from the first system information area, a system information message for the different system information area is applied.

2. The method of claim 1, where the determining is performed by a network management entity.

3. The method of claim 1, wherein the predefined time is based on timestamps.

4. The method of claim 3, wherein the timestamps comprise indications of system information requests by the user equipment to a serving base station of the user equipment.

5. The method of claim 4, wherein the timestamps indicating the system information requests along with system information messages associated with the requests are forwarded to the network management entity for the network management entity to ascertain the predefined time being met.

6. The method of claim 1, where the determining is performed by the user equipment.

7. The method of claim 6, wherein a timer is started when the user equipment replaces the system information message of the first system information area with the system information message of the second system information area or with the cell-specific system information message of the other cell, and wherein the expiration of the timer is the predefined time.

8. The method of claim 7, wherein if the user equipment replaces a system information message while the timer is running, then the user equipment will stop the timer and create and/or store a report.

9. The method of claim 8, wherein the user equipment sends the created and/or stored report to the network upon receiving a network request.

10. The method of claim 7, wherein when the timer expires, then any report is discarded.

11. An apparatus comprising: at least one processor and at least one memory including computer program code, wherein the at least one memory and the computer code are configured, with the at least one processor, to cause the apparatus to at least:

determine whether a user equipment, where the user equipment is in a cell of a wireless communications network and where the user equipment replaced a system information message of a first system information area with a system information message of a second system information area or with a cell-specific system information message of another cell, applied a stored or acquired system information message of a third system information area within a predefined time, wherein the predefined time is based on a start and expiration time of a timer by the user equipment, wherein, when the third system information area being the same system information area as the first system information area, the system information message for the first system information area is applied; and wherein, when the third system information area being a different system information area from the first system information area, a system information message for the different system information area is applied.

12. The apparatus of claim 11, wherein the apparatus is a network management entity.

13. The apparatus of claim 11, wherein the predefined time is based on timestamps.

14. The apparatus of claim 13, wherein the timestamps comprise indications of system information requests by the user equipment to a serving base station of the user equipment.

15. The apparatus of claim 14, wherein the timestamps indicating the system information requests along with system information messages associated with the requests are forwarded to the network management entity for the network management entity to ascertain the predefined time being met.

16. The apparatus of claim 11, wherein the apparatus is the user equipment.

17. The apparatus of claim 16, wherein a timer is started when the user equipment replaces the system information message of the first system information area with the system information message of the second system information area or with the cell-specific system information message of the other cell, and wherein the expiration of the timer is the predefined time.

18. The apparatus of claim 17, wherein if the user equipment replaces a system information message while the timer is running, then the user equipment will stop the timer and create and/or store a report.

19. The apparatus of claim 18, wherein user equipment sends the created and/or stored report to the network upon receiving a network request.

20. The apparatus of claim 17, wherein when the timer expires, then any report is discarded.

* * * * *